(12) United States Patent
Sullivan et al.

(10) Patent No.: US 6,581,140 B1
(45) Date of Patent: Jun. 17, 2003

(54) METHOD AND APPARATUS FOR IMPROVING ACCESS TIME IN SET-ASSOCIATIVE CACHE SYSTEMS

(75) Inventors: Steven C. Sullivan, Austin, TX (US); Michael D. Snyder, Austin, TX (US); Magnus K. Bruce, Cedar Park, TX (US)

(73) Assignee: Motorola, Inc., Schaumburg, IL (US)

( * ) Notice: Subject to any disclaimer, the term of this patent is extended or adjusted under 35 U.S.C. 154(b) by 289 days.

(21) Appl. No.: 09/609,749

(22) Filed: Jul. 3, 2000

(51) Int. Cl.[7] ............................................. G06F 12/00
(52) U.S. Cl. .................... 711/128; 711/204; 711/213
(58) Field of Search ................................. 711/128, 204, 711/213

(56) References Cited

U.S. PATENT DOCUMENTS

| 5,845,323 A | * 12/1998 | Roberts et al. ............. 711/128 |
| 6,016,533 A | * 1/2000 | Tran ........................... 711/118 |
| 6,247,094 B1 | * 6/2001 | Kumar et al. ............... 711/118 |
| 6,356,990 B1 | * 3/2002 | Aoki et al. .................. 711/128 |
| 6,418,525 B1 | * 7/2002 | Charney et al. ............ 711/128 |
| 6,425,075 B1 | * 7/2002 | Stiles et al. ................. 711/168 |

OTHER PUBLICATIONS

Inoue et al., "Way-Predicting Set-Associative Cache for High Performance and Low Energy Consumption," IEEE, pp 273–275, Aug. 1999.*

* cited by examiner

Primary Examiner—Matthew Kim
Assistant Examiner—Stephen Elmore
(74) Attorney, Agent, or Firm—Michael P. Noonan; James L. Clingan, Jr.

(57) ABSTRACT

A system provides a method and apparatus for accessing information in a cache in a data processing system. The system optimizes a speed-critical path within the cache system by using a prediction scheme. The prediction scheme subdivides the address range of address bits and compares the portions separately. A comparison of a critical portion of the address, along with a prediction bit, are used to generate a prediction.

20 Claims, 4 Drawing Sheets

METHOD AND APPARATUS FOR IMPROVING ACCESS TIME IN SET-ASSOCIATIVE CACHE SYSTEMS

FIELD OF THE INVENTION

The present invention relates to data processor memories, and in particular, the present invention relates to a method and apparatus for improving the speed in which memory is accessed.

RELATED ART

In general, data processing systems comprise a central processing unit (CPU) that executes instructions that are fetched from a main memory. One method to improve the performance of the CPU is to use cache memory. Cache memory is high speed memory that works in conjunction with the CPU and the main memory to provide the necessary data to the CPU. With this architecture, a lower latency response time is possible than if the CPU fetches all instructions and operands directly from main memory. The improved performance is possible because the cache contains the data that the CPU is most likely to request in the near future. The cache is typically also much faster than the main memory, therefore, the cache can usually provide the data required by the CPU much faster than the main memory. Part of the methodology used to load data into the cache is to predict and store the data that is frequently used by the CPU and is likely to be used by the CPU in the near future.

One type of cache memory is organized into a structure known as an "associative" structure (also referred to as "set associative"). In an associative structure, the blocks of storage locations are accessed as arrays having rows (often referred to as "sets") and columns (often referred to as "ways"). When a cache is searched for bytes residing at an address, a number of bits from the address are used as an "index" into the cache. The index selects a particular set within the array, and therefore the number of address bits required for the index is determined by the number of sets configured into the cache. The act of selecting a set via an index is referred to as "indexing". The addresses associated with bytes stored in the multiple ways of a set are examined to determine if any of the addresses stored in the set match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

The blocks of memory configured into a set form the columns of the set. Each block of memory is referred to as a "way"; multiple ways comprise a set. The way is selected by providing a way value to the cache. The way value is determined by examining the tags for a set and finding a match between one of the tags and the requested address. A cache designed with one way per set is referred to as a "direct-mapped cache". In a direct-mapped cache, the tag must be examined to determine if an access is a cache hit, but the tag examination is not required to select which bytes are transferred to the outputs of the cache. Since only an index is required to select bytes from a direct-mapped cache, the direct-mapped cache is a "linear array" requiring only a single value to select a storage location within it.

The hit rate in a data cache is important to the performance of a data processing system because when a miss is detected the data must be fetched from the memory system. The microprocessor will quickly become idle while waiting for the data to be provided. Set-associative caches require more access time than direct-mapped caches since the tags must be compared to the requested address and the resulting hit information must then be used to select which data bytes should be conveyed out of the data cache. As the clock frequencies of data processing systems increase, there is less time to perform the tag comparison and way selection. Therefore, there is a need for a data cache having the advantages of a set-associative cache with faster access times.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

In general, the present invention relates to a method and apparatus for accessing information in a cache in a data processing system. The invention subdivides the effective address range of address bits in the cache system and uses the critical portion, along with a way-select prediction bit, for way selection. Since a partial comparison is used for way selection, way-select information can be generated much earlier versus comparing the full range of address bits. The resulting reduction in hardware in the critical speed path allows for an improvement in speed with little or no performance penalty if the way selection prediction is correct most of the time. While the invention will be described as applying to a cache, the invention applies to other types of memory access (e.g., translation look aside buffer, etc). In addition, the invention applies to both the accessing of data information, instruction information, address translation information, which is also known as a translation lookaside buffer, and other types of information.

Figure 1:
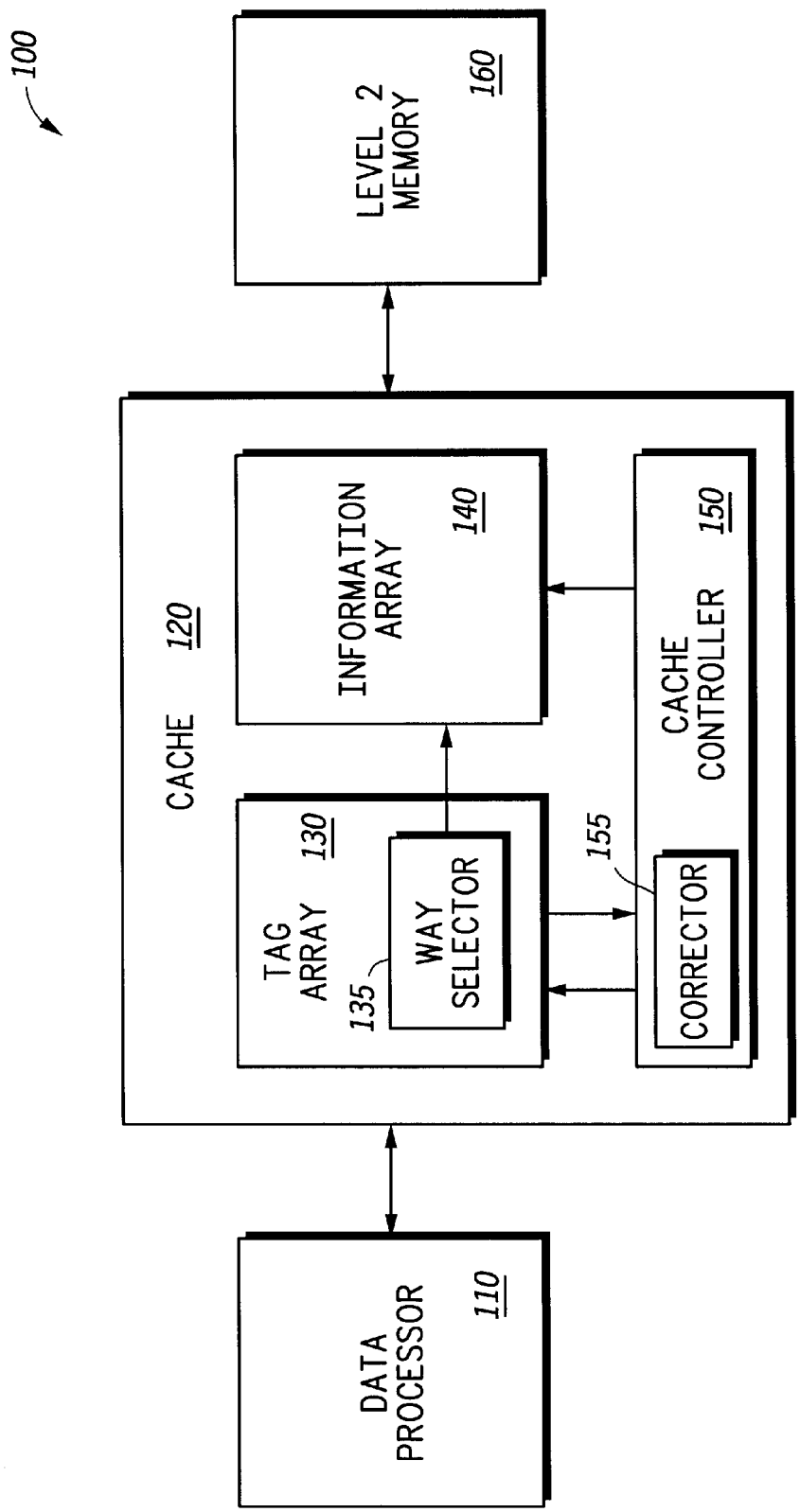
FIG. 1 is a system level block diagram.

FIG. 1 is a block diagram of a system 100 including a data processor 110, a cache 120, and a level 2 memory 160. Note that the data processor 110 may be comprised of any type of processor, including, but not limited to a microprocessor, microcontroller, digital signal processor (DSP), etc. Also, the level 2 memory 160 may be comprised of RAM, DRAM, cache, disk, or any other type of memory. The cache 120 is formed by a tag array 130 and an information array 140. The tag array 130 and information array 140 further comprise a plurality of tag entries and information entries. The information entries may include data information or instruction information corresponding to information stored in the level 2 memory 160. The tag entries are a type of address information. The tag array 130 includes a way selector 135. The cache 120 also includes a cache controller 150 including a prediction corrector 155. All of these components of the cache 120 are described in detail below.

Figure 2:
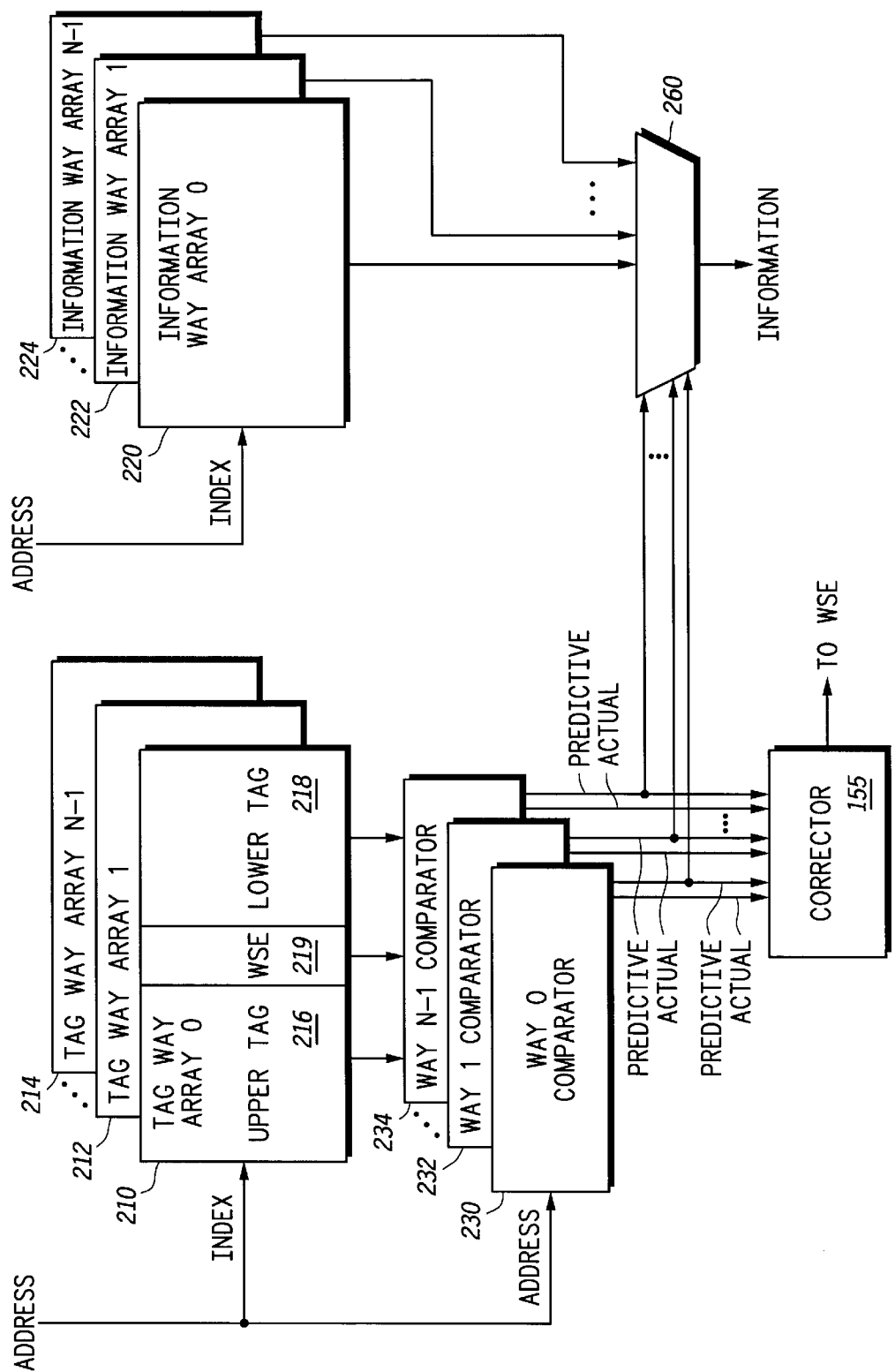
FIG. 2 is a block diagram of an N way cache including tag way arrays, information way arrays, and a way selector.

FIG. 2 is a block diagram illustrating one embodiment of the tag array 130, information array 140, and cache controller 150. Note that only the portions relevant to this invention are shown. The tag array 130 includes N tag way arrays 210, 212, and 214 (i.e., tag way 0, tag way 1, . . . tag way N-1) where each way includes multiple rows of address tags. Each address tag is subdivided into an upper tag portion 216, a lower tag portion 218, and a one-bit way select enable (hereinafter "wse") 219. The wse 219 may be referred to as a field, a predictive hit field, or any other suitable term. Note that the wse bit 219 could be located anywhere in the tag. Also note that the tag ways can be divided into upper and lower tag portions in any desired way. In one example, for a 64-bit architecture, the upper tag portion is comprised of bits [0:31] of the address and the lower tag portion is comprised of bits [32:51] of the address. The remaining bits may be allocated for index and offset information.

Each address tag in each way is associated with a corresponding memory location in the information array 140. The information array 140 includes N information way arrays 220, 222, and 224 (i.e., information way 0, information way 1, . . . information way N-1). For any given index value (from an address corresponding to an information request from data processor 110) the present invention selects information from one of the ways 220, 222, or 224 depending on the result of the way selector 135. The tag array 130 also includes N way comparators 230, 232, and 234 (i.e., way 0 comparator, way 1 comparator, . . . way N-1 comparator), each corresponding to one of the tag way arrays. The details of the way comparators described below with respect to FIG. 3. Each way comparator includes three inputs coming from the upper tag 216, lower tag 218, and wse 219 of its corresponding tag way array. Therefore, the information contained in the upper tag 216, lower tag 218, and wse 219 of the selected row of each way is provided as an input to the way comparator. For example, the information in the upper tag 216 of the tag way 0 array 210 provides the input to the upper tag input of the way 0 comparator 230. Each way comparator includes an actual hit output and a predictive hit output (described below). The actual hit and predictive hit outputs are provided as inputs to the corrector 155 which corrects the value of the wse 219 where necessary. The predictive hit outputs are also provided to multiplexer 260. The values of the predictive hit outputs determine which of the information ways is selected to provide information to the data processor 110.

Figure 4:
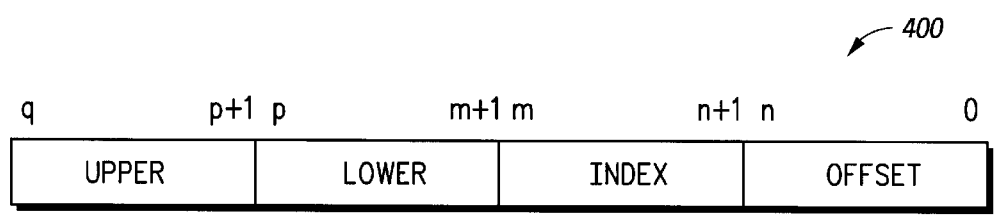
FIG. 4 is a diagram illustrating the fields of a q-bit address of one embodiment of the present invention.

FIG. 4 is a diagram illustrating how an address is partitioned according to one embodiment of the present invention. The example shown in FIG. 4 is a q-bit address. A first portion of the address is labeled "offset" and includes bits [0 to n]. The purpose of the offset information is to tell the system where the relevant data is located within a block in the information array. A second portion of the address is labeled "index" and includes bits [n+1 to m]. The purpose of the index information is to tell the system in which row of the array the relevant data is located. The index information can therefore provide indexed tag information including indexed predictive hit information. Third and fourth portions of the address are labeled "lower" and "upper" and include bits [m+1 to p] and [p+1 to q], respectively. The lower and upper portions together form the tag information. The purposes of the lower and upper information are described below.

Figure 3:
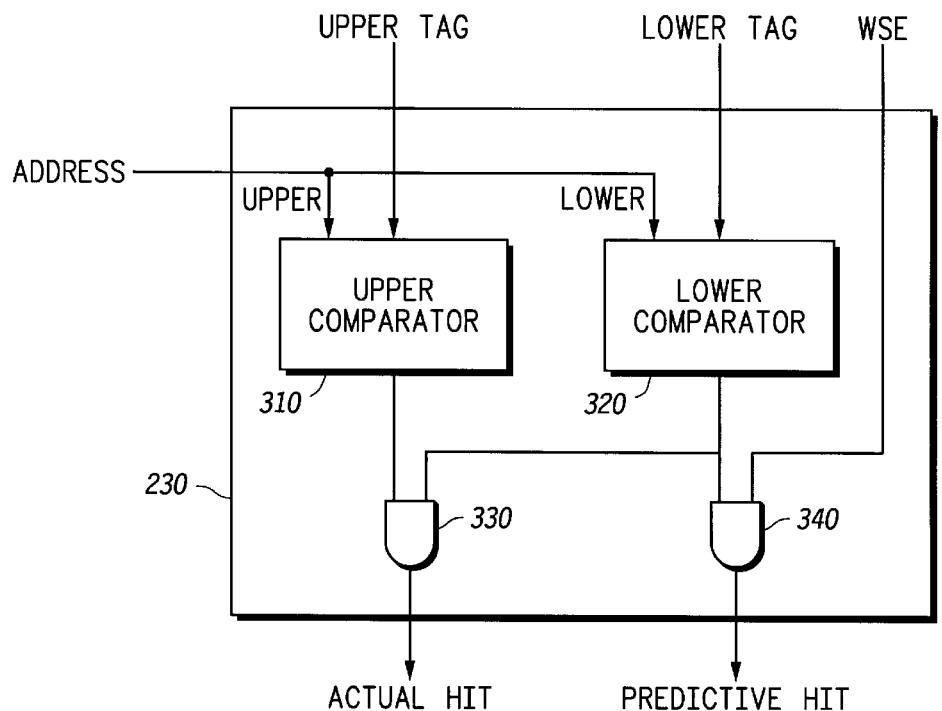
FIG. 3 is a block diagram of a way selector depicting actual and predictive hits.

FIG. 3 is a block diagram of the way comparator 230. Note that in this embodiment, all of the way comparators are identical, so only way 0 comparator 230 is shown and described. The way comparator 230 includes an upper comparator 310 and a lower comparator 320. The function of the lower comparator 320 is to compare the selected lower tag 218 in the tag way 210 with the lower portion of the requested address 400 (see FIG. 4). The output of the lower comparator 320 is sent to a first AND gate 330 and a second AND gate 340. The output of the lower comparator 320 will be "true" when the compared data is the same (a lower "hit", or a "preliminary predictive hit") and "false" when the compared data is not the same. Note that the convention of "true" or "false" can be reversed, or other conventions used. The AND gate 340 has a second input corresponding to wse 219 in the tag way 0 array 210. In one embodiment, wse 219 will be either be a "0" or a "1" (described below). Note that the wse 219 may also have a reversed or different convention. When the output of the lower comparator 320 is "true" and the wse bit is a "1", the output of the AND gate 340 will be true (a "predictive hit"). Otherwise, the output is false. The output of the AND gate 340 is sent to the multiplexer 260 and the corrector 155. As is described below, no more than one output of the way comparators 230, 232, and 234 will be true. Therefore, the way comparator which generates a predictive hit will cause the multiplexer 260 to select the information in the information array 220, 222, or 224 corresponding to the tag way array 210, 212, or 214 which resulted in the predictive hit. The output of the AND gate 340 is also sent to the corrector 155 for changing the wse 219 value (described below).

The function of the upper comparator 310 shown in FIG. 3 is to compare the selected upper tag 216 in the tag way 0 array 210 with the lower portion of the requested address 400 (see FIG. 4). The output of the upper comparator 310 is sent to the second AND gate 330. The output of the upper comparator 310 will be "true" when the compared data is the same (an upper "hit", or a "preliminary actual hit") and "false" when the compared data is not the same. The output of the AND gate 330 is true when the outputs of the upper and lower comparators 310 and 320 are both true (an "actual hit"). The output of the AND gate 330 is sent to the corrector 155 and used for changing the wse 219 value if necessary (described below). Note that other inputs to the AND gates 330 and 340 may also be used. For example, the tag way arrays could include a "valid" portion having a "valid" bit. In this example, the information in the tag way arrays could be flagged as "valid" or "invalid" by changing the value of the valid bit. The AND gates 330 and 340 may then each include a third input connected to the valid bit such that the cache will not be accessed when the requested address is flagged as invalid. This and other inputs or flags may also be used, but are not shown for purposes of clarity. Note that the function of AND gates 330 and 340, which operate as combinational logic, may be implemented by other circuitry or other types of circuit modules (or "combinational module") performing an equivalent function.

One benefit of the present invention is that "actual hit" and "predictive hit" determinations are made in parallel. Since the determination of an actual hit requires a comparison of a larger number of bits than the determination of a predictive hit, the determination of a predictive hit takes significantly less time than the determination of an actual hit. Therefore, when a predictive hit occurs, the multiplexer 260 can send the appropriate information to the data processor 110 even before it is determined whether an actual hit occurs. As a result, the access time is faster than prior art systems.

Figure 5:
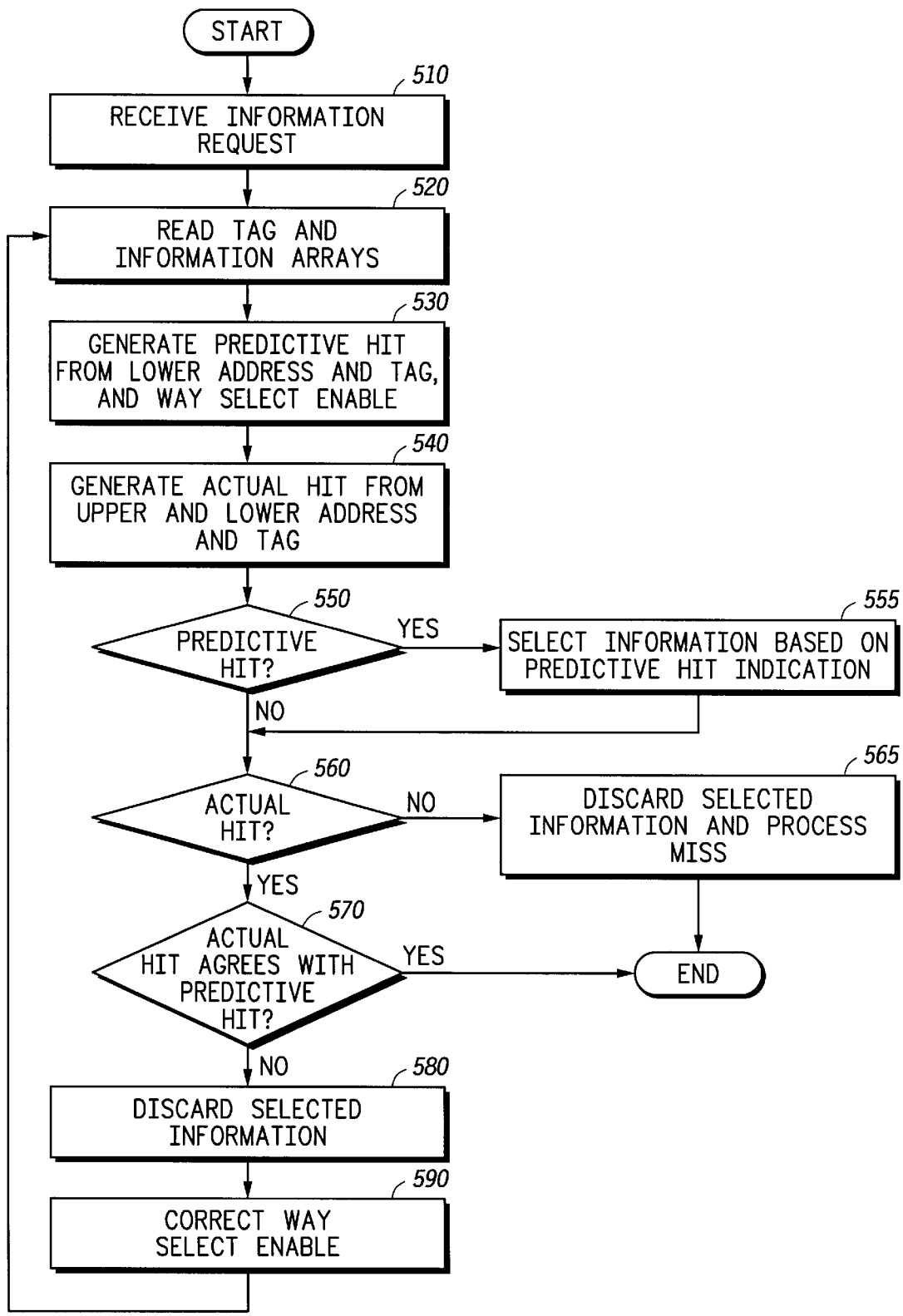
FIG. 5 is a flowchart illustrating one example of a process for selecting an information array.

Following is a description of the operation of one embodiment of the present invention. FIG. 5 is a flowchart illustrating one example of the process of accessing information from the cache 120 shown in FIG. 1. At step 510, an information request is received from the data processor 110. If the requested information is in the cache 120, the access time is considerably lower than if the requested information is not in the cache 120. Therefore, the process described below determines whether the information is in the cache and how to find and retrieve it in an efficient manner. The information request from the data processor 110 includes the address 400 shown in FIG. 4. The index portion of the address 400 indicates which row in each of the arrays should be selected. So for each information request, there is a set of tags, one for each array. The upper and lower portions of the address 400 form the tag information. At step 520, the tag and information way arrays (FIG. 2) are read. Next, at step 530, the predictive hit signal is generated for each way of the cache as described above based on the lower address, the lower tag, and the wse. At the same time, the generation of the actual hit signal is also initiated (step 540). As was mentioned above, the actual hit signal takes longer to generate than the predictive hit signal.

The process then proceeds to step 550. Note that the process continues even if the actual hit signal is not yet generated. Also note that the steps listed above occur in parallel for each of the tag way arrays and way comparators. The process, at step 550, asks whether any of the generated predictive hit signals are true. In other words, step 550 asks whether any of the lower comparators 320 generated a lower hit and whether the corresponding wse was true. If there was a predictive hit, the process proceeds to step 555 and information is selected based on the predictive hit indication. In other words, the predictive hit signals cause the multiplexer 260 to select information from the appropriate information way array. This information is sent back to the data processor 110. The process then proceeds to step 560. If there are no predictive hits, the process proceeds to step 560 without any information selected. At step 560, the process asks whether any of the generated actual hit signals are true (an "actual hit"). If not, at step 565 the selected information from step 555 is discarded and the "miss" is processed. If there was an actual hit, then the process proceeds to step 570 which asks whether the actual hit agrees with the predictive hit. In other words, if the predictive hit correctly predicted the appropriate data, the process ends. If the predictive hit does not agree with the actual hit, then the predictive hit is wrong and the process proceeds to step 580 which discards the selected information. In addition, the wse bit is corrected at step 590. After the wse is corrected, the process goes back to step 520.

The correction of the wse in step 590 is described as follows. As mentioned above, in one embodiment, the wse 219 is 1 bit. When information is written into the tag way arrays 210, 212, and 214 for a selected index row, the wse bit in each tag of the selected set is either enabled or disabled (corresponding to a logical value "1" or "0" respectively). For any one set of tag information, there can only be one enabled wse bit for each common lower tag 218. In other words, if 2 or more of the selected sets have identical lower tags 218, only one can have an enabled wse bit. In one embodiment, the wse bit corresponding to the selected way is enabled for future accesses. As a result, the wse bit stores predictive hit information based on previous accesses to the memory system. To correct the wse (step 590), the wse bit in the way resulting in an actual hit is enabled. In other words, the wse bit is enabled in the way containing the correct information. At the same time, the wse bit that was enabled and caused the incorrect predictive hit is disabled.

The variable identifiers "m" and "n" and others are used in several instances in the figures to more simply designate the final element (e.g., bit m, way N, etc.) of a series of related or similar elements (e.g., bits of address field 400, ways 210, 212 . . . 214, etc.). The repeated use of such variable identifiers herein is not meant to imply a correlation between the sizes of such series of elements. The use of such variable identifiers does not require that each series of elements has the same number of elements as another series delimited by the same variable identifier. Rather, in each instance of use, the variable identified by "N" or "m" may hold the same or a different value than other instances of the same variable identifier. For example, way N−1 214 may be the fourth, eighth, or other number way in the N-way associative cache 120, whereas bit n may be the sixth, twelfth or other number bit in an address or tag.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising a memory system coupled to provide information responsive to receiving a requested address corresponding to the information, the memory system including:

N information way arrays, each information array including a plurality of information entries for storing information; and N tag way arrays corresponding to the N information way arrays, each tag way array including a plurality of tag entries, each tag entry including a predictive hit field for storing predictive hit information based upon previous accesses of the memory system, wherein each tag way array is coupled to provide a first portion of tag information from a tag entry identified by an index portion of the requested address and is coupled to provide indexed predictive hit information of the tag entry identified by the index portion of the requested address; and wherein the apparatus further comprises a cache controller coupled to provide a predictive hit output responsive to receiving a first portion of the requested address, the first portion of tag information, and the indexed predictive hit information.

2. The apparatus of claim 1 further comprising:

a selector coupled to select information from the information way arrays based on the predictive hit information.

3. The apparatus of claim 1 wherein
the information includes at least one of data information or instruction information; and
the memory system is an N-way set associative cache unit.

4. The apparatus of claim 1 wherein
the information includes address information; and
the memory system is an N-way set associative translation lookaside buffer.

5. An apparatus comprising a memory system coupled to provide information responsive to receiving a requested address corresponding to the information, the memory system including:
N information way arrays, each information array including a plurality of information entries for storing information; and
N tag way arrays corresponding to the N information way arrays, each tag way array including a plurality of tag entries, each tag entry including a predictive hit field for storing predictive hit information based upon previous accesses of the memory system;
wherein each tag way array is coupled to provide a first portion of tag information from a tag entry identified by an index portion of the requested address and is coupled to provide indexed predictive hit information of the tag entry identified by the index portion of the requested address; and
the apparatus further comprises
a first comparator, the first comparator being coupled to provide a preliminary predictive hit output responsive to receiving a first portion of the requested address and the first portion of tag information; and
a combinational module coupled to provide a predictive hit output responsive to receiving the preliminary predictive hit output and the indexed predictive hit information.

6. The apparatus of claim 5 further comprising
a second comparator, the second comparator being coupled to provide a preliminary actual hit indication responsive to receiving a second portion of the requested address, and a second portion of the tag information; and
a combinational module coupled to provide an actual hit indication responsive to receiving the preliminary actual hit indication and the preliminary predictive hit output.

7. The apparatus of claim 6 wherein the combinational module is combinational logic which substantially performs a logic AND function.

8. An apparatus comprising a memory system coupled to provide information responsive to receiving a requested address corresponding to the information, the memory system including:
N information way arrays, each information array including a plurality of information entries for storing information; and
N tag way arrays corresponding to the N information way arrays, each tag way array including a plurality of tag entries, each tag entry including a predictive hit field for storing predictive hit information based upon previous accesses of the memory system;
wherein each tag way array is coupled to provide tag information from a tag entry identified by an index portion of the requested address and is coupled to provide indexed predictive hit information of the tag entry identified by the index portion of the requested address; and the apparatus further comprises a cache controller coupled to provide a predictive hit output responsive to receiving a first portion of the requested address, a first portion of the tag information, and the indexed predictive hit information and coupled to provide an actual hit indication responsive to receiving a second portion of the requested address, a second portion of the tag information, and the predictive hit output.

9. The apparatus of claim 8 wherein
the first portion of the requested address includes bits having a lower order than bits of the second portion of the requested address.

10. The apparatus of claim 8 further comprising:
a corrector for correcting the predictive hit information when the actual hit indication and the predictive hit output do not agree.

11. The apparatus of claim 8 further comprising:
a selector coupled to select information from the information arrays based on the predictive hit output.

12. A memory system for storing information, the memory system comprising:
N information way arrays, each information array including a plurality of information entries for storing information; and
N tag way arrays, each tag way array corresponding to an information way array, each tag way array including a plurality of tag entries, each tag entry corresponding to an information entry, each tag entry including a field for selecting a valid one of the N information way arrays;
wherein each tag way array includes first and second portions, the memory system further comprising a way selector for selecting the valid one of the N information way arrays based on the field and on the first portion of the tag way array; and
wherein the way selector further comprises comparators for comparing the first portions of the tag way arrays with corresponding portions of the information way arrays.

13. The memory system of claim 12, wherein the way selector further comprises combinational modules for generating predictive hits based on information from the comparators and from the field.

14. A method for predicting a cache hit during an access of a memory system having a plurality of tag way arrays and corresponding information way arrays, the method comprising:
receiving a request for information including a requested address;
partitioning each tag way array into portions; and
generating a predictive hit output based on the requested address and a first portion of each tag way array;
wherein the first portion of each tag way array contains address information;
wherein a second portion of each tag way array contains predictive hit information; and;
wherein the generated predictive hit is generated based on the requested address and the first and second portions of each tag way array.

15. The method of claim 14, wherein the second portion of each tag way array is comprised of a bit.

16. The method of claim 14, further comprising the step of generating an actual hit indication based on the requested address and address information in the tag way arrays.

17. The method of claim 16 further comprising the step of comparing the actual hit indication and the predictive hit output to determine a memory access hit or miss.

18. A method for predicting a cache hit during an access of a memory system having a plurality of tag way arrays and corresponding information way arrays, the method comprising:

receiving a request for information including a requested address;

partitioning each tag way array into portions;

generating a predictive hit output based on the requested address and a first portion of each tag way array; and selecting information from one of the plurality of information way arrays based on the generated predictive hit output.

19. The method of claim 18, further comprising the step of determining whether the selected information is the same as the requested information.

20. The method of claim 19, further comprising the step of discarding the selected information if it is not the same as the requested information.

* * * * *